United States Patent
Hasti et al.

(10) Patent No.: US 7,610,373 B2
(45) Date of Patent: Oct. 27, 2009

(54) VOTING MECHANISM FOR SESSION INVALIDATION PROCESSING IN AN APPLICATION SERVER CLUSTER

(75) Inventors: Srinivas Hasti, Raleigh, NC (US); Gabriel G. Montero, Chapel Hill, NC (US); Gautam Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 10/854,908

(22) Filed: May 27, 2004

(65) Prior Publication Data

US 2006/0031467 A1    Feb. 9, 2006

(51) Int. Cl.
 *G06F 15/173* (2006.01)
(52) U.S. Cl. .................. 709/224; 709/227; 709/205
(58) Field of Classification Search .......... None
 See application file for complete search history.

(56) References Cited

U.S. PATENT DOCUMENTS

| | | | |
|---|---|---|---|
| 6,490,624 B1 * | 12/2002 | Sampson et al. ............ | 709/227 |
| 6,587,860 B1 | 7/2003 | Chandra et al. | |
| 6,675,199 B1 | 1/2004 | Mohammed et al. | |
| 7,231,445 B1 * | 6/2007 | Aweya et al. ............... | 709/226 |
| 2002/0116532 A1 * | 8/2002 | Berg .......................... | 709/246 |
| 2003/0023680 A1 | 1/2003 | Shirriff | |
| 2004/0019660 A1 * | 1/2004 | E. et al. ....................... | 709/219 |
| 2004/0193656 A1 * | 9/2004 | Pizzo et al. ................. | 707/201 |

* cited by examiner

*Primary Examiner*—Pierre M Vital
*Assistant Examiner*—Christopher J Raab
(74) *Attorney, Agent, or Firm*—A. Bruce Clay; Hoffman Warnick LLC (57) ABSTRACT

Under the present invention, there is provided a voting mechanism for assigning an application server of an application server cluster the task of invalidating all sessions containing listeners in the cluster for a web application. A method for session invalidation processing comprises assigning a vote to a web application upon launch of the web application in an application server of the application server cluster, broadcasting the vote to other application servers of the application server cluster, receiving a vote for the web application from each of the other application servers in the application server cluster in which the web application has been launched, and assigning invalidation processing to the application server containing the web application having the highest vote. The votes are dynamically updated upon the removal or addition of an application server from/to the application server cluster.

16 Claims, 6 Drawing Sheets

| ID | WEIGHT |
|---|---|
| WebApp1/AppServer1 | 0.321 |
| WebApp1/AppServer2 | 0.123 |
| WebApp1/AppServer3 | 0.987 |
|  |  |
| WebApp2/AppServer1 | 0.222 |
| WebApp2/AppServer2 | 0.666 |
| WebApp2/AppServer3 | 0.111 |
|  |  |
| WebApp3/AppServer1 | 0.567 |
| WebApp3/AppServer2 | 0.432 |
| WebApp3/AppServer3 | 0.011 |

| ID | WEIGHT |
|---|---|
|  |  |
| WebApp1/AppServer2 | 0.123 |
| WebApp1/AppServer3 | 0.987 |
|  |  |
|  |  |
| WebApp2/AppServer2 | 0.666 |
| WebApp2/AppServer3 | 0.111 |
|  |  |
|  |  |
| WebApp3/AppServer2 | 0.432 |
| WebApp3/AppServer3 | 0.011 |

| ID | WEIGHT |
|---|---|
| WebApp1/AppServer1 | 0.321 |
| WebApp1/AppServer2 | 0.123 |
| WebApp1/AppServer3 | 0.987 |
| WebApp1/AppServer4 | 0.888 |
| | |
| WebApp2/AppServer1 | 0.222 |
| WebApp2/AppServer2 | 0.666 |
| WebApp2/AppServer3 | 0.111 |
| WebApp2/AppServer4 | 0.777 |
| | |
| WebApp3/AppServer1 | 0.567 |
| WebApp3/AppServer2 | 0.432 |
| WebApp3/AppServer3 | 0.011 |
| WebApp3/AppServer4 | 0.600 |

118

VOTING MECHANISM FOR SESSION INVALIDATION PROCESSING IN AN APPLICATION SERVER CLUSTER

BACKGROUND OF THE INVENTION

1. Field of the Invention

The present invention generally relates to a cluster of application servers. More particularly, the present invention provides a voting mechanism for assigning an application server of an application server cluster the task of invalidating all sessions containing listeners in the cluster for a web application.

2. Related Art

An Http session object is created to store information specific to a certain web user. Http sessions are run under and managed by application server processes. The lifetime of an Http session can be specified by a TimeOut interval, which when elapsed makes the session eligible for invalidation. Applications can register a listener object in a session, which will get notified when session invalidation happens. In this way an application can free up the resources that are being used by that web user or provide special processing for that web user. In a clustered environment, a session is replicated to multiple servers so that session information is not lost when one of the server crashes. A session that has timed out should be invalidated only once and this can be done by any application server process in the cluster.

In a clustered environment a web application can run in more than one application server and each application server is responsible for invalidating sessions of the web applications installed on it. An application server contains a background invalidation process (or thread) to determine the candidates for invalidation and to perform invalidation. An application server can choose to have a single invalidation process that goes through all web applications or can have a separate invalidation process for each web application. One problem that occurs is that multiple invalidation processes can run concurrently and the same session can get invalidated multiple times in different servers. This is especially problematic if the sessions contain listener objects that get invoked upon session invalidation and the listeners get invoked multiple times.

Figure 1:
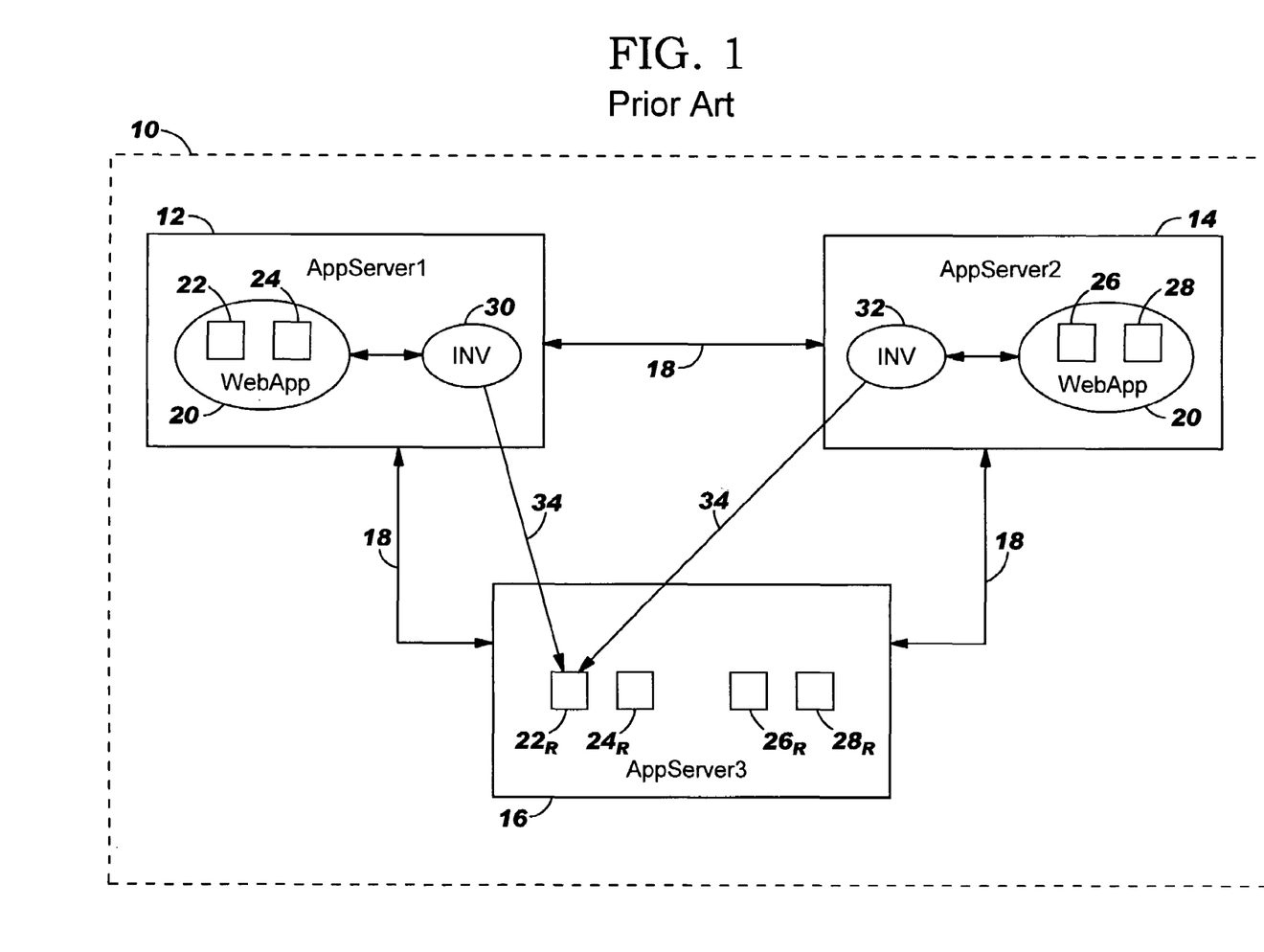
FIG. 1 depicts an application server cluster of the prior art.

An example of the above-described problem is illustrated in FIG. 1. In this example, three application servers AppServer1 12, AppServer2 14, and AppServer3 16 are organized in a cluster 10. In cluster 10, application server AppServer3 16 serves as a backup server to application servers AppServer1 12 and AppServer2 14. Application servers AppServer1 12, AppServer2 14, and AppServer3 16 can communicate with each other as indicated by arrows 18.

A web application WebApp 20 runs in application servers AppServer1 12 and AppServer2 14. In application server AppServer1 12, web application WebApp 20 includes sessions 22 and 24, which contain listener objects. In application server AppServer2 14, WebApp 20 includes sessions 26 and 28, which also contain listener objects. To provide persistent session information, sessions 22 and 24 in WebApp 20 (AppServer1 12) are replicated to AppServer3 16, as indicated by reference numerals $22_R$ and $24_R$. Likewise, sessions 26 and 28 in WebApp 20 (AppServer2 14) are replicated to AppServer3 16, as indicated by reference numerals $26_R$ and $28_R$.

AppServer1 12 includes an invalidator 30 that provides invalidation processing for WebApp 20 using the replicated sessions stored in AppServer3 16. Similarly, AppServer2 14 includes an invalidator 32 that provides invalidation processing for WebApp 20 using the replicated sessions stored in AppServer3 16. It is assumed in this example that session 22 of WebApp 20 is to be invalidated (e.g., in response to the elapsing of a TimeOut interval). To this extent, invalidator 30 for WebApp 20 in AppServer1 12 and invalidator 32 for WebApp 20 in AppServer2 14 can concurrently invalidate session 22 using the replicated session $22_R$ stored in AppServer3 16 as indicated by arrows 34, leading to duplicative invalidation and listener processing. As such, there is a need to prevent such duplicative processing from occurring.

SUMMARY OF THE INVENTION

In general, the present invention provides a voting mechanism for assigning an application server of an application server cluster the task of invalidating all sessions containing listeners in the cluster for a web application.

A first aspect of the present invention is directed to a method for session invalidation processing in an application server cluster, comprising: assigning a vote to a web application upon launch of the web application in an application server of the application server cluster; broadcasting the vote to other application servers of the application server cluster; receiving a vote for the web application from each of the other application servers in the application server cluster in which the web application has been launched; and assigning invalidation processing to the application server containing the web application having the highest vote.

A second aspect of the present invention is directed to a system for session invalidation processing in an application server cluster, comprising: a system for assigning a vote to a web application upon launch of the web application in an application server of the application server cluster; a system for broadcasting the vote to other application servers of the application server cluster; a system for receiving a vote for the web application from each of the other application servers in the application server cluster in which the web application has been launched; and a system for assigning invalidation processing to the application server containing the web application having the highest vote.

A third aspect of the present invention is directed to a program product, stored on a recordable medium, for session invalidation processing in an application server cluster, which when executed, comprises: program code for assigning a vote to a web application upon launch of the web application in an application server of the application server cluster; program code for broadcasting the vote to other application servers of the application server cluster; program code for receiving a vote for the web application from each of the other application servers in the application server cluster in which the web application has been launched; and program code for assigning invalidation processing to the application server containing the web application having the highest vote.

A fourth aspect of the present invention is directed to a system for deploying a session invalidation processing application, comprising: a computer infrastructure being operable to: assign a vote to a web application upon launch of the web application in an application server of an application server cluster; broadcast the vote to other application servers of the application server cluster; receive a vote for the web application from each of the other application servers in the application server cluster in which the web application has been launched; and assign invalidation processing to the application server containing the web application having the highest vote.

A fifth aspect of the present invention is directed to computer software embodied in a propagated signal for deploying session invalidation processing in an application server cluster, the computer software comprising instructions to cause a computer system to perform the following functions: assign a vote to a web application upon launch of the web application in an application server of an application server cluster; broadcast the vote to other application servers of the application server cluster; receive a vote for the web application from each of the other application servers in the application server cluster in which the web application has been launched; and assign invalidation processing to the application server containing the web application having the highest vote.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a voting mechanism for assigning an application server of an application server cluster the task of invalidating all sessions containing listeners in the cluster for a web application. In particular, whenever a web application is launched in any of the application servers in the cluster, the web application in the application server is assigned a vote by the voting mechanism. The vote contains a random weight (e.g., generated by a random number generator) and other details for unique identification of the web application/application server combination. The vote is stored in that application server and is broadcast to all other application servers in the cluster, which also store the vote. The application server with the instance of the web application with the highest weight vote is then assigned the task of invalidating all sessions containing listeners in the cluster for that web application.

Whenever an invalidation process tries to perform invalidation of a web application in an application server, the voting mechanism of the present invention determines whether the web application in that application server has the highest weight vote in the cluster. If so, the invalidation process in that application server performs the required invalidation processing for all instances of the web application running in the application servers of the cluster. If not, the application server in the cluster containing the web application with the highest weight vote performs the invalidation processing. In this way, the task of invalidating sessions containing listeners is delegated to only one application server, thereby preventing the same session from being invalidated multiple times by multiple application server invalidation processes.

If an application server is stopped, fails for any reason, or is removed from the cluster, then all of the votes owned by the web applications running in that application server are removed from the other application servers in the cluster. For each web application, the application server with the instance of the web application containing the highest weight vote in the remaining application servers of the cluster then takes up the responsibility of invalidating sessions for that web application. Similarly if a new application server joins the cluster, its web application votes are broadcast to all other application servers in the cluster. If the vote for a particular web application in the newly added application server is higher than the current highest vote, then the application server with the instance of the web application previously delegated with the task of invalidating sessions yields the invalidation processing to the newly added application server containing the same web application.

It is assumed for the purposes of this description that the reader has an understanding of application servers, application server clusters, web applications, sessions, listener objects, replication, invalidation processing, commensurate with one skilled in the art. Accordingly, a detailed description of these topics is not provided herein.

Figure 2:
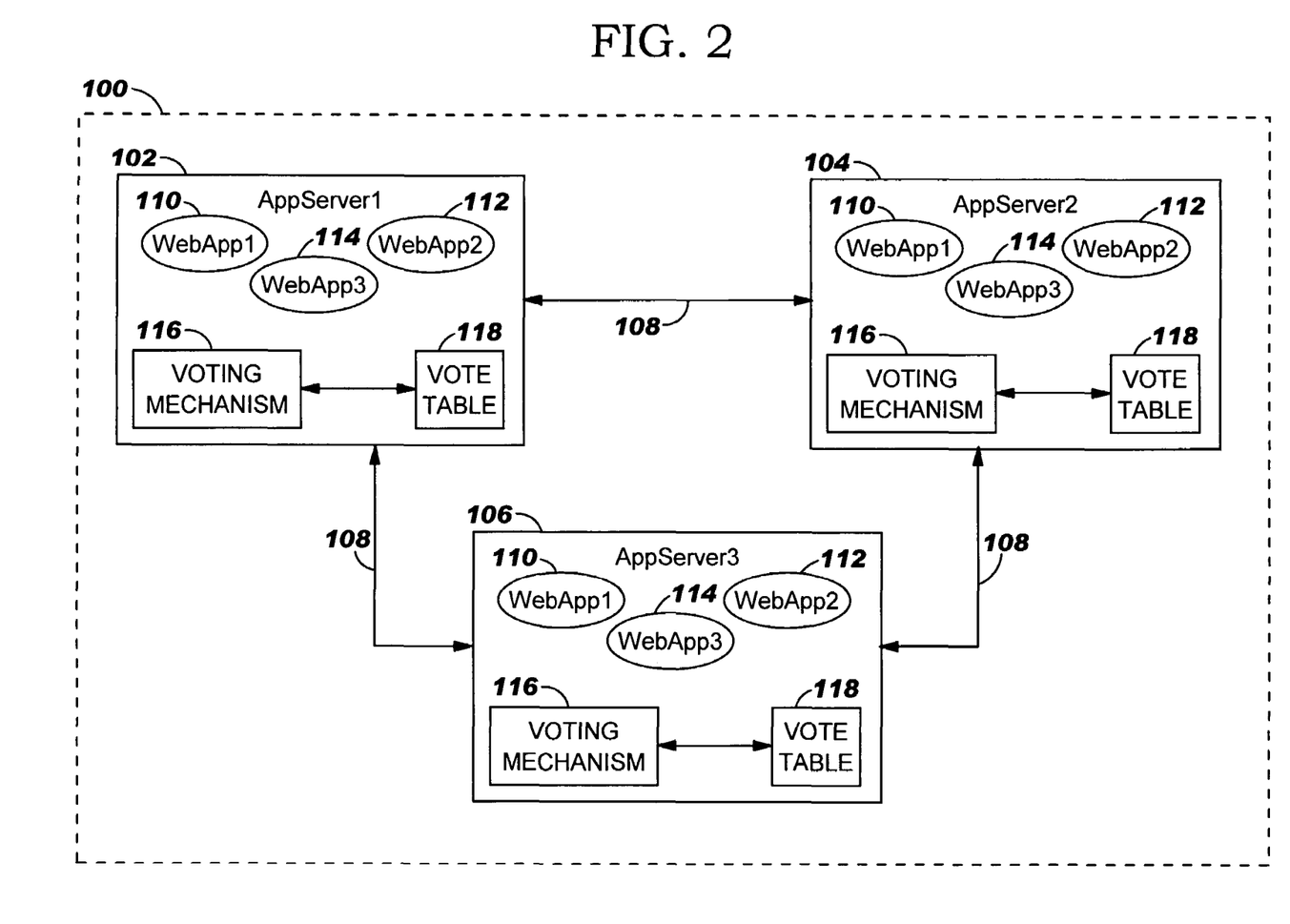
FIG. 2 depicts a plurality of application servers arranged in a cluster, wherein each application server includes a voting mechanism in accordance with the present invention.

Referring now to FIG. 2, there is illustrated an application server cluster 100 comprising a plurality of application servers. Each application server includes a voting mechanism in accordance with the present invention. In this example, the cluster 100 includes three application servers AppServer1 102, AppServer2 104, and AppServer3 106. The application servers AppServer1 102, AppServer 2 104, and AppServer3 106 can communicate with each other as indicated by arrows 108. Although described as including three application servers, it will be apparent to one skilled in the art that the cluster 100 may include any plurality of application servers. Also, it should be understood that the architecture shown in FIG. 2 is illustrative only and will likely include other known components not shown.

Each application server AppServer1 102, AppServer2 104, and AppServer3 106 is shown as including three web applications WebApp1 110, WebApp2 112, and WebApp3 114, a voting mechanism 116, and a vote table 118. Although described as including the same three web applications, it will be apparent to one skilled in the art that the application servers can include different numbers and types of web applications.

Whenever a web application (e.g., WebApp1 110) is launched in an application server (e.g., AppServer1 102) in the cluster 100, the voting mechanism 116 of that application server assigns a vote to the web application. The vote contains a random weight and other details for unique identification of the web application/application server combination. The random weight can be generated using any known random number generation system. The identification details may comprise an identifier of the web application and an identifier of the application server in which the web application was launched. The vote is stored in the vote table 118 of the application server and is broadcast by the voting mechanism 116 to all other application servers (e.g., AppServer2 104, AppServer3 106) in the cluster 100, which also store the vote in their respective vote tables 118. The application server with the instance of the web application (WebApp 1 110) with the highest weight vote is then assigned the task of invalidating all sessions containing listeners in the cluster 100 for that web application.

Figure 3:
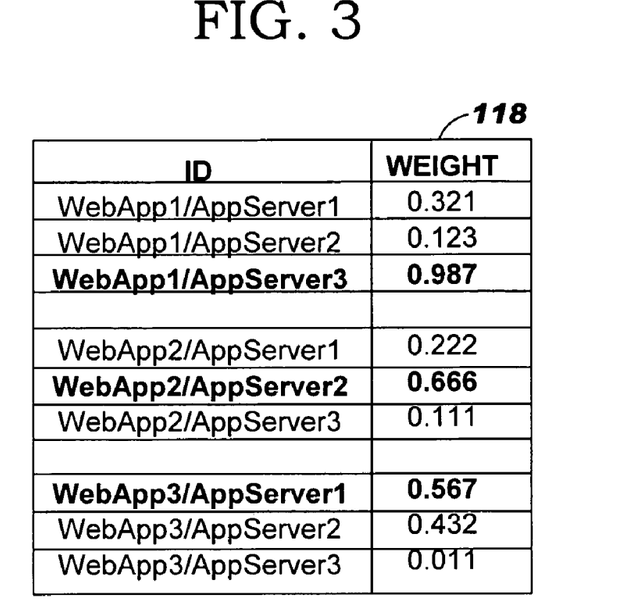
FIGS. 3-5 depict illustrative vote tables in accordance with the present invention.

As an example of the above-described voting process, assume that web applications WebApp1 110, WebApp2 112, and WebApp3 114 were launched in application servers AppServer1 102, AppServer2 104, and AppServer3 106, and that the associated votes for each web application WebApp1 110, WebApp2 112, and WebApp3 114 generated by the voting mechanisms 116 of the application servers AppServer1 102, AppServer2 104, and AppServer3 106 were stored in vote tables 118. An example of such a vote table 118 for AppServer1 102, AppServer2 104, and AppServer3 106 is illustrated in FIG. 3. As shown, web application WebApp1 110 was assigned a random weight of 0.321 and an ID of WebApp1/AppServer1 when launched in application server AppServer1 102, a random weight of 0.123 and an ID of WebApp1/AppServer2 when launched in application server AppServer2 104, and a random weight of 0.987 and an ID of WebApp1/AppServer3 when launched in application server AppServer3 106. Since the highest random weight for web application WebApp1 110 was generated during its launch in application server AppServer3 106, AppServer3 306 is "elected" to perform the task of invalidating all sessions containing listeners for web application WebApp1 110 in application servers AppServer1 102, AppServer2 104, and AppServer3 106 of cluster 100. In a similar manner, AppServer2 104 for web application WebApp2 112 (random weight=0.666) and AppServer1 102 for web application WebApp3 114 (random weight 0.567) are "elected" to perform the task of invalidating all sessions containing listeners for web application WebApp2 112 and WebApp3 114, respectively.

After a predetermined polling interval, the votes in vote tables 118 are reexamined to determine if there has been any change in the voting. Such a change in voting may occur, for example, if an application server is removed from the cluster 100 or if an application server is added to the cluster 100. Examples of these conditions are described below.

Figure 4:
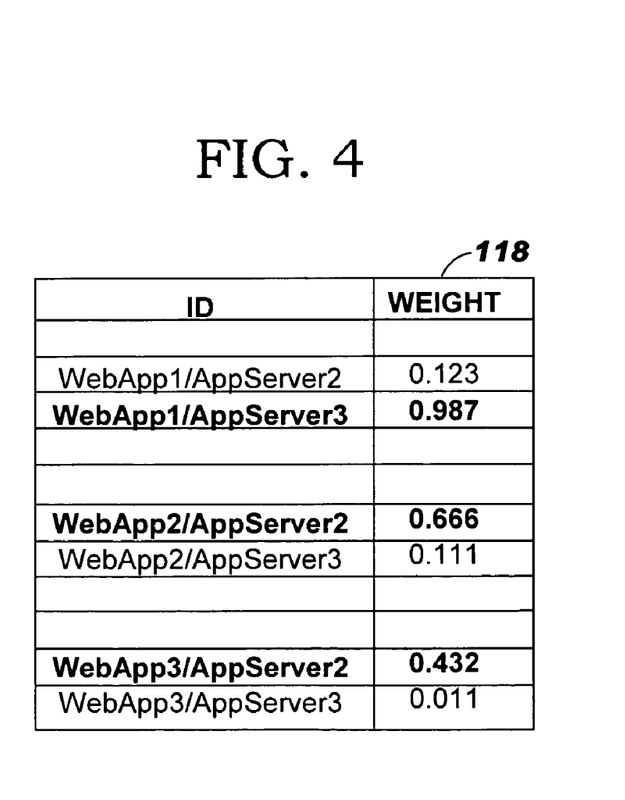

In accordance with the present invention, when an application server is stopped, terminated abruptly, or otherwise removed from the cluster, then all the votes owned by the web applications running in that application server are removed from the vote tables in the other remaining application servers in the cluster. For each web application, the application server with the instance of the web application containing the highest weight vote in the remaining application servers of the cluster then takes up the responsibility of invalidating sessions for that web application. An example of vote table 118 after application server AppServer1 102 has been removed from the cluster 100 is illustrated in FIG. 4. In this case, application server AppServer3 106 continues to provide invalidation processing for web application WebApp1 110, application server AppServer2 104 continues to provide invalidation processing for web application WebApp2 112, while AppServer2 104 takes over the invalidation processing for web application WebApp3 114.

Figure 5:
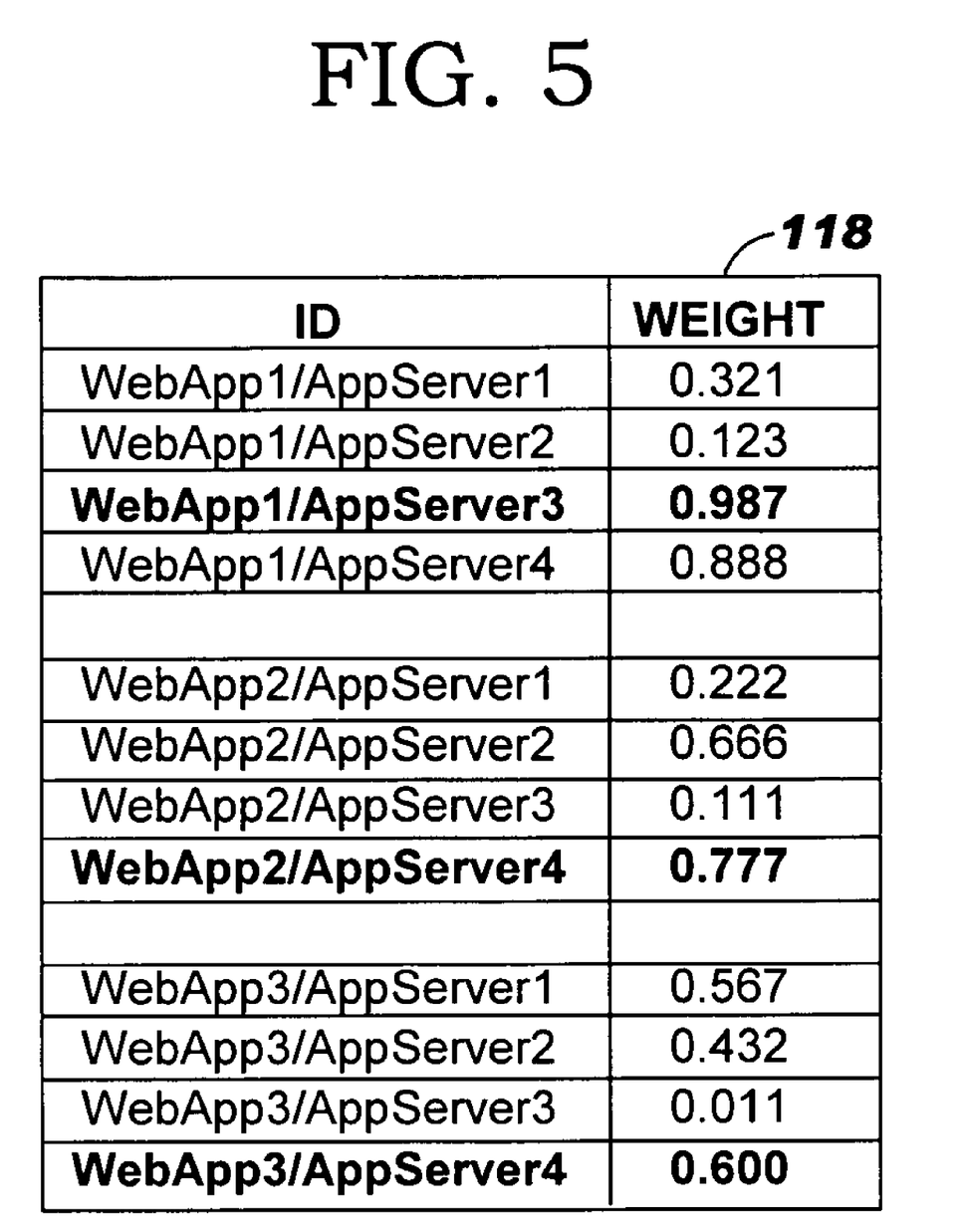

Similarly, if a new application server AppServer4 joins the cluster 100, its web application votes are broadcast to the other application servers AppServer1 102, AppServer2 104, and AppServer3 104 in the cluster 100 and stored in the corresponding vote tables 118 of the application servers. If the newly added vote for a particular web application is higher than the current one, the application server previously delegated with the task of invalidating sessions yields and lets the newly added application server AppServer4 with the web application with the higher vote take over the invalidation processing. An example of a vote table 118 after application server AppServer4 has been added to the cluster 100 is illustrated in FIG. 5. In this case, AppServer3 106 continues to provide invalidation processing for web application WebApp 1 110, while newly added application server AppServer4 take over the invalidation processing for web applications WebApp2 112 and WebApp3 113, respectively.

Figure 6:
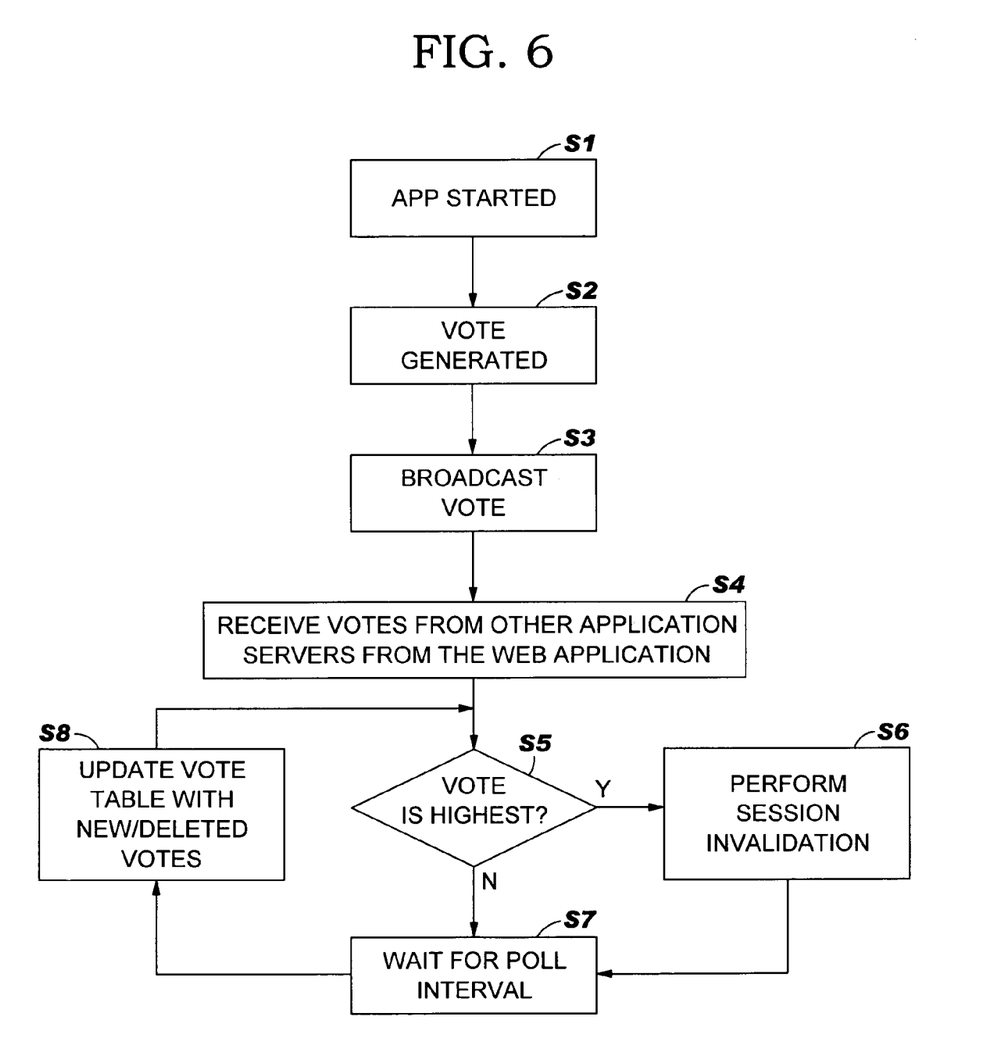
FIG. 6 depicts a flow diagram illustrating a voting mechanism for invalidation processing in an application server cluster in accordance with the present invention.

A flow diagram illustrating a voting mechanism for invalidation processing in an application server cluster in accordance with the present invention is illustrated in FIG. 6. In step S1, a web application is started in an application server and a vote is generated (step S2). The vote contains a random weight and other details for unique identification of the web application/application server combination. In step S3 the vote is broadcast to all other application servers in the cluster. In step S4 votes generated for the web application in the other application servers in the cluster are received and stored. In step S5, the web application determines if its vote is the highest for the web application in the cluster. If yes, the application server on which the web application is running performs invalidation processing (step S6) for all instances of the web application running in the application servers of the cluster. If not, another application server in the cluster (i.e., the application server on which the instance of the web application with the highest weight is running) performs the invalidation processing. After waiting the poll interval (step S7), the vote table for the application server is dynamically updated (step S8) with new or deleted votes, if any, (e.g., in response to the addition/deletion of an application server from the cluster), and step S5 is repeated.

Figure 7:
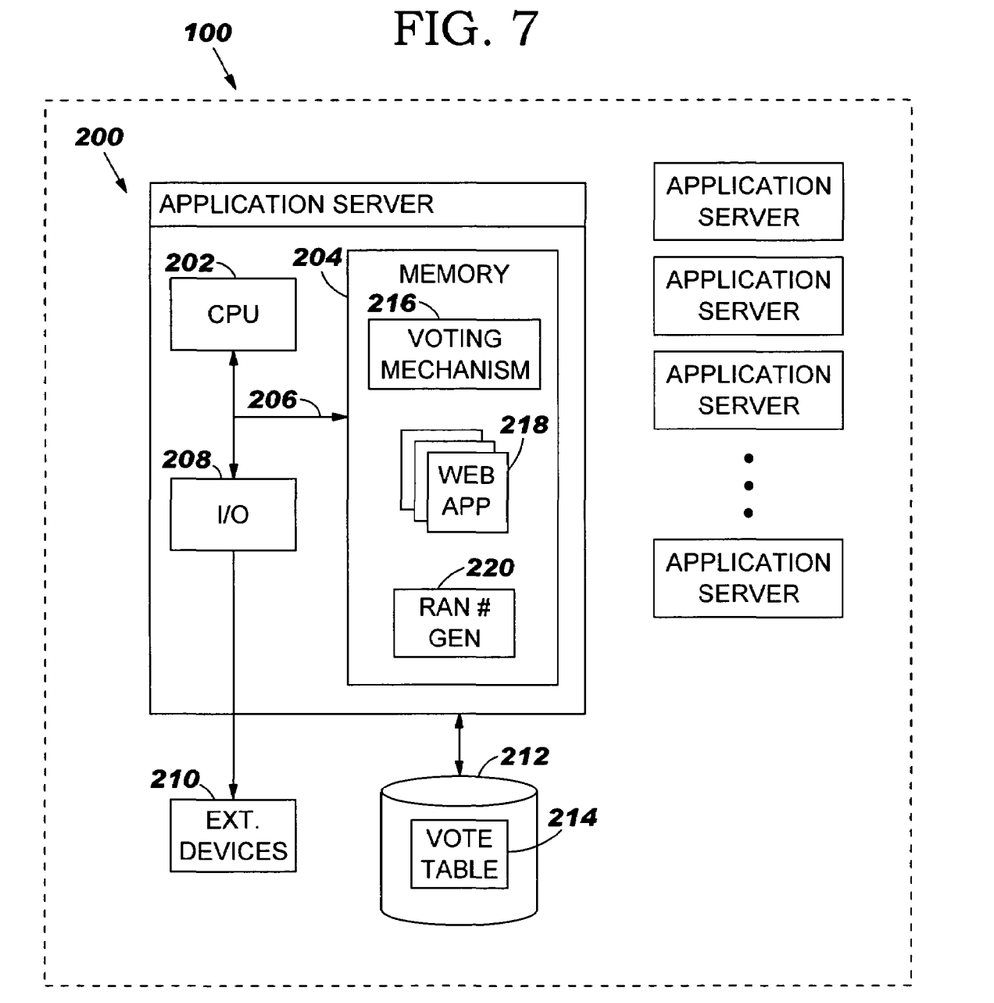
FIG. 7 illustrates an example of a computerized system capable of implementing the present invention.

Referring now to FIG. 7, an application server 200 capable of implementing the method of the present invention is illustrated in detail. As shown, the application server 200 is part of a cluster 100 comprising a plurality of interconnected application servers.

The application server 200 generally comprises a central processing unit (CPU) 202, memory 204, bus 206, input/output (I/O) interfaces 208, external devices/resources 210, and a storage unit 212. CPU 202 may comprise a single processing unit, or may be distributed across one or more processing units in one or more locations. Memory 204 may comprise any known type of data storage and/or transmission media, including magnetic media, optical media, random access memory (RAM), read-only memory (ROM), a data cache, a data object, etc. Moreover, similar to CPU 202, memory 204 may reside at a single physical location, comprising one or more types of data storage, or may be distributed across a plurality of physical systems in various forms.

I/O interfaces 208 may comprise any system for exchanging information to/from an external source. External devices/resources 210 may comprise any known type of external device, including speakers, a CRT, LCD screen, handheld device, keyboard, mouse, voice recognition system, speech output system, printer, monitor/display, facsimile, pager, etc. Bus 206 provides a communication link between each of the components in computer system 200 and likewise may comprise any known type of transmission link, including electrical, optical, wireless, etc.

Storage unit 212 can be any system capable of providing storage for information necessary for the practice of the present invention, such as vote table 214. Storage unit 212 may reside at a single physical location, comprising one or more types of data storage, or may be distributed across a plurality of physical systems in various forms. In another embodiment, storage unit 212 may be distributed across, for example, a local area network (LAN), wide area network (WAN) or a storage area network (SAN) (not shown).

Shown in memory 204 of application server 200 is voting mechanism 216, which may be provided as a computer program product. The voting mechanism 216 is provided to assign a vote to a web application 218 when the web application 218 is launched in the application server 200. The vote contains a random weight and other details for unique identification of the web application/application server combination. The random weight can be generated using a random number generation system 220.

The vote is stored in vote table 214 and is broadcast to all other application servers in the cluster 100, which also store the vote. If the instance of the web application 218 in the application server 200 has the highest weight vote, the voting mechanism 216 assigns the application server 200 the task of invalidating all sessions containing listeners in the cluster 100 for that web application 218.

Whenever an invalidation process wakes up for the web application 218 in the application server 200, the voting mechanism 216 determines whether the instance of the web application 218 in application server 200 has the highest weight vote in the cluster 100. If so, application server 200 performs the required invalidation processing for the web application 218. If not, the application server containing the instance of the web application with the highest weight vote, running in one of the other application servers in the cluster, performs the invalidation processing. In this way, the task of invalidating sessions containing listeners is delegated to only one application server for a given web application, thereby preventing the same session from being invalidated multiple times by multiple application server invalidation processes.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for session invalidation processing in an application server cluster, said application server cluster comprising a plurality of application servers, the method comprising:

generating a random weight vote using a random number generator for each instance of a web application contained in the cluster;

assigning the random weight vote to each web application upon each launch of the web application in an application server of the application server cluster;

broadcasting the vote to other application servers of the application server cluster;

receiving a vote for the web application from each of the other application servers in the application server cluster in which the web application has been launched;

storing the votes in a vote table in each of the application servers in the application server cluster;

dynamically updating the votes in the vote table of each application server in the application server cluster;

assigning invalidation processing to the application server containing the web application having the highest vote in the updated vote table, wherein the highest vote comprises the highest weight vote; and performing invalidation processing for all instances of the web application running in the application servers of the application server cluster.

2. The method of claim 1, wherein the application server containing the web application having the highest vote performs invalidation processing for all instances of the web application on the application servers in the application server cluster.

3. The method of claim 1, wherein the step of dynamically updating occurs after a predetermined polling period.

4. The method of claim 1, wherein the votes are dynamically updated upon removal of an application server from the application server cluster, or upon addition of an application server to the application server cluster.

5. The method of claim 1, wherein the vote further comprises an identification of the web application and the application server on which the web application was launched.

6. A computerized system for session invalidation processing in an application server cluster, said application server cluster comprising a plurality of application servers, comprising:

a random number generator for generating a random weight vote for each instance of a web application contained in the cluster;

a system for assigning the random weight vote to each web application upon launch of the web application in an application server of the application server cluster;

a system for broadcasting the vote to other application servers of the application server cluster;

a system for receiving a vote for the web application from each of the other application servers in the application server cluster in which the web application has been launched;

a system for storing the votes in a vote table in each of the application servers in the application server cluster;

a system for dynamically updating the votes in the vote table of each application server in the application server cluster;

a system for assigning invalidation processing to the application server containing the web application having the highest vote in the updated vote table, wherein the highest vote comprises the highest weight vote; and a system for performing invalidation processing for all instances of the web application running in the application servers of the application server cluster.

7. The system of claim 6, wherein the application containing the web server containing the web application having the highest vote performs invalidation processing for all instances of the web application on the application servers in the application server cluster.

8. The system of claim 6, wherein the system for dynamically updating updates the votes in the vote table after a predetermined polling period.

9. The system of claim 6, wherein the system for dynamically updating updates the votes in the vote table upon removal of an application server from the application server cluster, or upon addition of an application server to the application server cluster.

10. The system of claim 6, wherein the vote further comprises an identification of the web application and the application server on which the web application was launched.

11. A computer program product, stored on a computer readable medium, for session invalidation processing in an application server cluster, said application server cluster comprising a plurality of application servers, which when executed, comprises:

program code for generating a random weight vote for each instance of a web application contained in the cluster;

program code for assigning the random weight vote to each web application upon launch of the web application in an application server of the application server cluster;

program code for broadcasting the vote to other application servers of the application server cluster;

program code for receiving a vote for the web application from each of the other application servers in the application server cluster in which the web application has been launched, wherein the highest vote comprises the highest weight vote;

program code for storing the votes in a vote table in each of the application servers in the application server cluster;

program code for dynamically updating the votes in the vote table of each application server in the application server cluster;

program code for assigning invalidation processing to the application server containing the web application having the highest vote in the updated vote table; and program code for performing invalidation processing for all instances of the web application running in the application servers of the application server cluster.

12. The program product of claim 11, wherein the application server containing the web application having the highest vote performs invalidation processing for all instances of the web application on the application servers in the application server cluster.

13. The program product of claim 11, wherein the votes in the vote table of each application server are dynamically updated after a predetermined polling period.

14. The program product of claim 11, wherein the votes are dynamically updated upon removal of an application server from the application server cluster, or upon addition of an application server to the application server cluster.

15. The program product of claim 11, wherein the vote further comprises an identification of the web application and the application server on which the web application was launched.

16. A computerized system for deploying a session invalidation processing application, comprising:

a computer infrastructure being operable to:

generate a random weight vote using a random number generator for each instance of a web application in an application server cluster;

assign the random weight vote to each web application upon launch of the web application in an application server of the application server cluster;

broadcast the vote to other application servers of the application server cluster;

receive a vote for the web application from each of the other application servers in the application server cluster in which the web application has been launched;

store the votes in a vote table in each of the application servers in the application server cluster;

dynamically update the votes in the vote table of each application server in the application server cluster;

assign invalidation processing to the application server containing the web application having the highest vote in the updated vote table, wherein the highest vote comprises the highest weight vote; and perform invalidation processing for all instances of the web application running in the application servers of the application server cluster.

* * * * *

UNITED STATES PATENT AND TRADEMARK OFFICE
CERTIFICATE OF CORRECTION

| | | |
|---|---|---|
| PATENT NO. | : 7,610,373 B2 | Page 1 of 1 |
| APPLICATION NO. | : 10/854908 | |
| DATED | : October 27, 2009 | |
| INVENTOR(S) | : Hasti et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 816 days.

Signed and Sealed this

Twelfth Day of October, 2010

David J. Kappos
*Director of the United States Patent and Trademark Office*